(12) United States Patent
Kim

(10) Patent No.: US 9,849,780 B2
(45) Date of Patent: Dec. 26, 2017

(54) SAFETY APPARATUS OF ACCELERATOR PEDAL FOR VEHICLE

(71) Applicant: Hyundai Motor Company, Seoul (KR)

(72) Inventor: Eun Sik Kim, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/151,759

(22) Filed: May 11, 2016

(65) Prior Publication Data

US 2016/0347174 A1 Dec. 1, 2016

(30) Foreign Application Priority Data

May 29, 2015 (KR) .......................... 10-2015-0075937

(51) Int. Cl.
| G05G 1/30 | (2008.04) |
| B60K 28/02 | (2006.01) |
| B60K 26/02 | (2006.01) |
| B60T 7/06 | (2006.01) |

(52) U.S. Cl.
CPC ............. B60K 28/02 (2013.01); B60K 26/02 (2013.01); B60T 7/06 (2013.01); G05G 1/30 (2013.01)

(58) Field of Classification Search
CPC ........ B60K 26/02; B60K 28/02; B60K 28/06; B60K 2026/026; B60K 26/021; B60T 7/04; B60T 7/06; G05G 1/30; G05G 1/323
See application file for complete search history.

(56) References Cited

U.S. PATENT DOCUMENTS

| 3,023,633 | A | * | 3/1962 | Tudos, Jr. | ............. | B60K 26/02 74/513 |
| 3,926,275 | A | * | 12/1975 | Nersesian | ............ | B60K 26/021 116/57 |
| 6,415,681 | B1 | * | 7/2002 | Porter | .................... | G05G 1/305 192/13 R |
| 2016/0052390 | A1 | * | 2/2016 | Park | ...................... | B60K 26/02 74/473.31 |

FOREIGN PATENT DOCUMENTS

| KR | 10-1997-0040466 A | 7/1997 |
| KR | 10-2013-0051834 A | 5/2013 |
| KR | 10-1439041 B1 | 9/2014 |
| KR | 10-1470187 B1 | 12/2014 |
| KR | 10-1601540 B1 | 3/2016 |

* cited by examiner

Primary Examiner — Adam D Rogers
(74) Attorney, Agent, or Firm — Morgan, Lewis & Bockius LLP

(57) ABSTRACT

A safety apparatus of an accelerator pedal for a vehicle may include a lever actuating hole formed through a pad of the accelerator pedal that is configured to be operated by a driver's foot, and a rotary lever passing through the lever actuating hole, and rotatably provided on the pad such that a first end of the rotary lever protrudes upwards from the pad and a second end of the rotary lever comes into contact with a pedal housing under the pad, the rotary lever preventing the pad from being rotated towards the pedal housing when the second end of the rotary lever comes into contact with the pedal housing.

11 Claims, 13 Drawing Sheets

SAFETY APPARATUS OF ACCELERATOR PEDAL FOR VEHICLE

CROSS REFERENCE TO RELATED APPLICATION

The present application claims priority to Korean Patent Application No. 10-2015-0075937, filed May 29, 2015, the entire contents of which is incorporated herein for all purposes by this reference.

BACKGROUND OF THE INVENTION

Field of the Invention

The present invention relates to a safety apparatus of an accelerator pedal for a vehicle. More particularly, the present invention relates to a safety apparatus of an accelerator pedal for a vehicle, the apparatus being capable of preventing the accelerator pedal from being operated, in a mal-operation where both a brake pedal and the accelerator pedal are operated in a vehicle braking condition.

Description of Related Art

An accelerator pedal for accelerating a vehicle and a brake pedal for braking the vehicle are installed at foot level in front of the vehicle. The accelerator pedal and the brake pedal are configured to be operated by a driver's foot.

The accelerator pedal and the brake pedal are operated depending on a driver's feeling or habit, in a situation where the driver cannot see the pedals with his or her eyes while a vehicle is running. Accordingly, in the case of an inexperienced driver or in an emergency situation, the driver may frequently confuse the accelerator pedal and the brake pedal and thereby may perform rapid acceleration instead of a braking operation in a situation where it is required to brake the vehicle, thus undesirably causing an accident.

In order to prevent the mal-operation of the accelerator pedal, technology has been proposed in which a cover separately made of a metal material is laid on a pad of the accelerator pedal operated by a driver's foot and a feeling different from the brake pedal is provided to the driver when he or she operates the pad, thus preventing the mal-operation.

However, in the case of simply laying the metal cover on the pad of the accelerator pedal, a driver may not determine the difference between the accelerator pedal and the brake pedal due to his or her shoes. In this case, the driver may still mal-operate the accelerator pedal, i.e., wrongly operate the accelerator pedal instead of the brake pedal.

As another example, technology is being developed, in which a camera sensor and an electronic controller are employed to cause an operation of the accelerator pedal to be forcibly stopped when the accelerator pedal is mal-operated in a situation where a braking operation is required. However, such a technology is problematic in that it has a complicated structure and is expensive, so that it is difficult to apply the technology to an inexpensive diffusion-type vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a safety apparatus of an accelerator pedal for a vehicle, the apparatus having a relatively simple mechanical structure that can be applied to the accelerator pedal to prevent the accelerator pedal from being operated by mistake instead of a brake pedal in a situation where a braking operation is required, and which prevents the accelerator pedal from being operated in the case of a mal-operation where both the brake pedal and the accelerator pedal are operated, thus enhancing the safety of the vehicle and further being applicable to an inexpensive diffusion-type vehicle.

According to various aspects of the present invention, a safety apparatus of an accelerator pedal for a vehicle may include a lever actuating hole formed through a pad of the accelerator pedal that is configured to be operated by a driver's foot, and a rotary lever passing through the lever actuating hole, and rotatably provided on the pad such that a first end of the rotary lever protrudes upwards from the pad and a second end of the rotary lever comes into contact with a pedal housing under the pad, the rotary lever preventing the pad from being rotated towards the pedal housing when the second end of the rotary lever comes into contact with the pedal housing.

The safety apparatus may further include a lever pin passing through the rotary lever to be coupled at first and second ends thereof to the pad, and serving as a rotation center of the rotary lever.

The safety apparatus may further include a lever spring secured at a first end thereof to the pad and at a second end thereof to the rotary lever, providing an elastic force to the rotary lever such that the second end of the rotary lever maintains contact with the pedal housing when the driver's foot presses down only the pad, and providing a returning force to the rotary lever such that the second end of the rotary lever maintains contact with the pedal housing when a driver's pressing force is removed from the rotary lever.

The lever actuating hole may include a first hole, formed by cutting, to connect an upper surface and a first side surface of the pad to each other, and allowing the first end of the rotary lever protruding upwards from the pad to be rotated without interfering with the pad, and a second hole formed by cutting a second side surface of the pad, and allowing the second end of the rotary lever protruding downwards from the pad to be rotated without interfering with the pad.

The first end of the rotary lever passing through the first hole and protruding upwards from the pad may be located at a central portion of a length of the pad in a longitudinal direction thereof, and located opposite to the brake pedal with reference to a central line bisecting a width of the pad in a transverse direction thereof.

The rotary lever may be provided diagonally from the first end thereof protruding upwards from the pad to the second end thereof, making contact with the pedal housing such that the rotary lever rotates smoothly when the driver's foot presses down the rotary lever.

The second end of the rotary lever may include a bent portion that surface contacts the pedal housing, and the bent portion exerts a support force on the pedal housing to prevent the pad from being rotated towards the pedal housing when the driver's foot presses down only the pad.

The bent portion may be connected via a round portion, and the round portion may make contact with the pedal housing when the rotary lever returns to an original position thereof, thus aiding in a returning operation of the rotary lever.

The pressing force may be removed in a state where the driver's foot presses down both the pad and the rotary lever, a returning force for causing the lever spring to return the rotary lever to an original position thereof with an accumulated elastic force may be larger than a returning force of the pad.

Pin coupling protrusions may protrude integrally from an edge of the first hole on a lower surface of the pad, and have holes such that first and second ends of a lever pin are coupled thereto.

The rotary lever may include a coupling portion coupled to the pin coupling protrusions using the lever pin, a manipulating portion passing through the first hole to protrude upwards from the pad, an extending portion extending towards the pedal housing, and a bent portion bent from the extending portion through a round portion.

As is apparent from the above description, the present invention is advantageous in that, even if a driver presses down an accelerator pedal instead of a brake pedal by mistake in a situation where a braking operation is required, a pad is prevented from being rotated towards a pedal housing in the situation where he or she does not press down a rotary lever but presses down only the pad of the accelerator pedal, thus preventing the mal-operation of the accelerator pedal and enhancing safety.

Particularly, the present invention is advantageous in that it is possible to prevent the mal-operation of an accelerator pedal using a rotary lever that is provided on a pad of the accelerator pedal, and the invention has a relatively simple configuration, is inexpensive, and is also applicable to an inexpensive diffusion-type vehicle.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The accelerator pedal of the vehicle is generally classified as a pendant type pedal that is hung from a dash panel, or an organ type pedal that is mounted on a floor panel. The safety apparatus according to the various embodiments of the present invention may be implemented in both the pendant type and the organ type accelerator pedals. Herein, an example where the safety apparatus is implemented in the organ-type accelerator pedal will be described.

Figure 1:
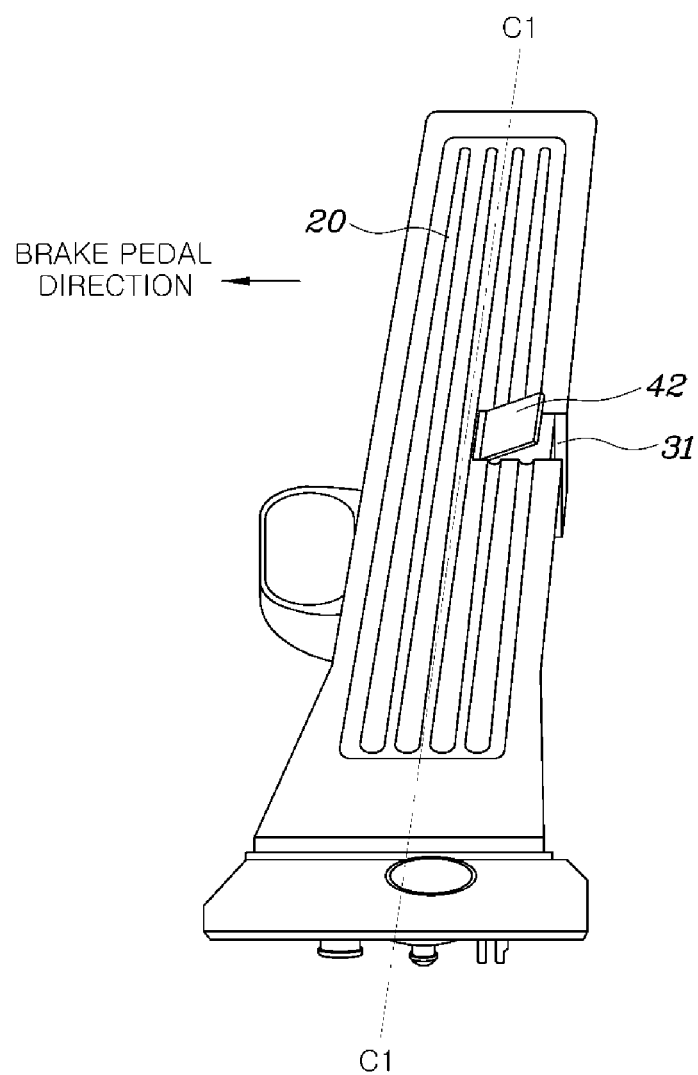
FIG. 1 is a front view illustrating an accelerator pedal for a vehicle having a safety apparatus according to the present invention.
Figure 2:
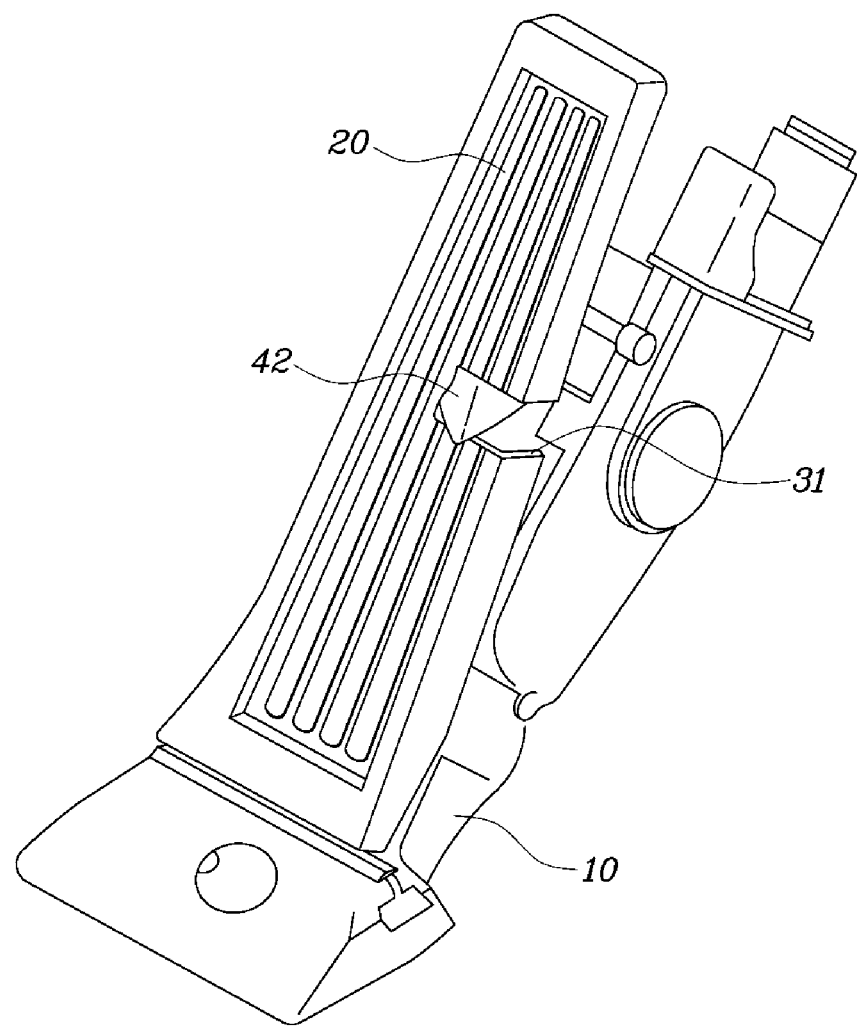
FIG. 2, FIG. 3, and FIG. 4 are a perspective view when viewed from the right, a perspective view when viewed from the left, and a rear view of FIG. 1, respectively.
Figure 3:
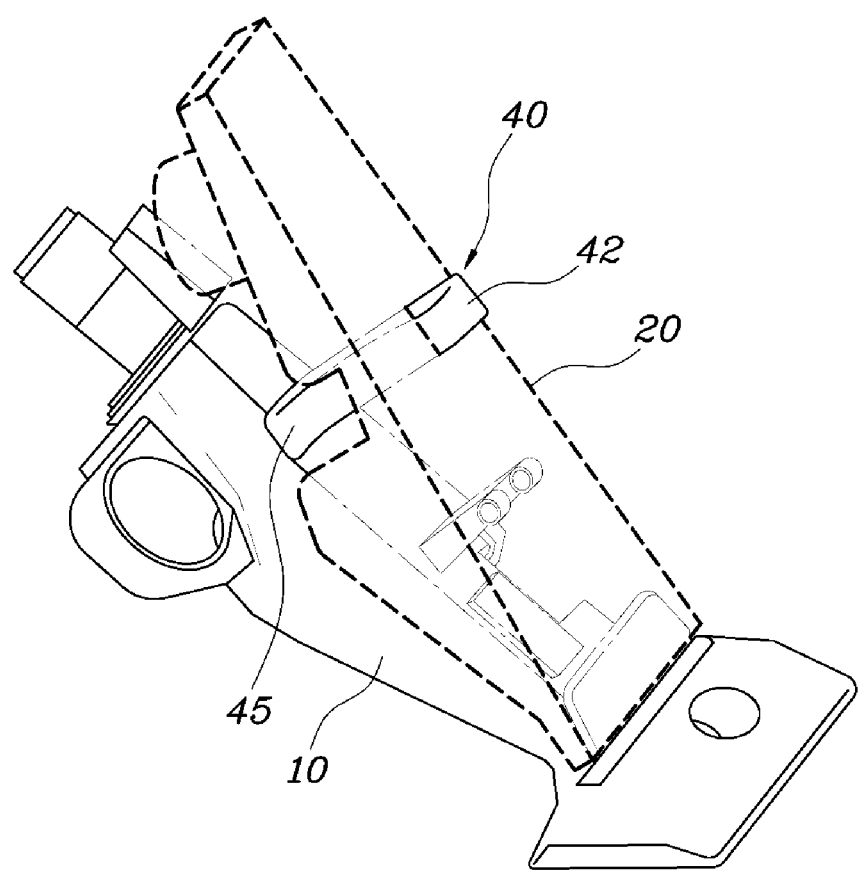
Figure 4:
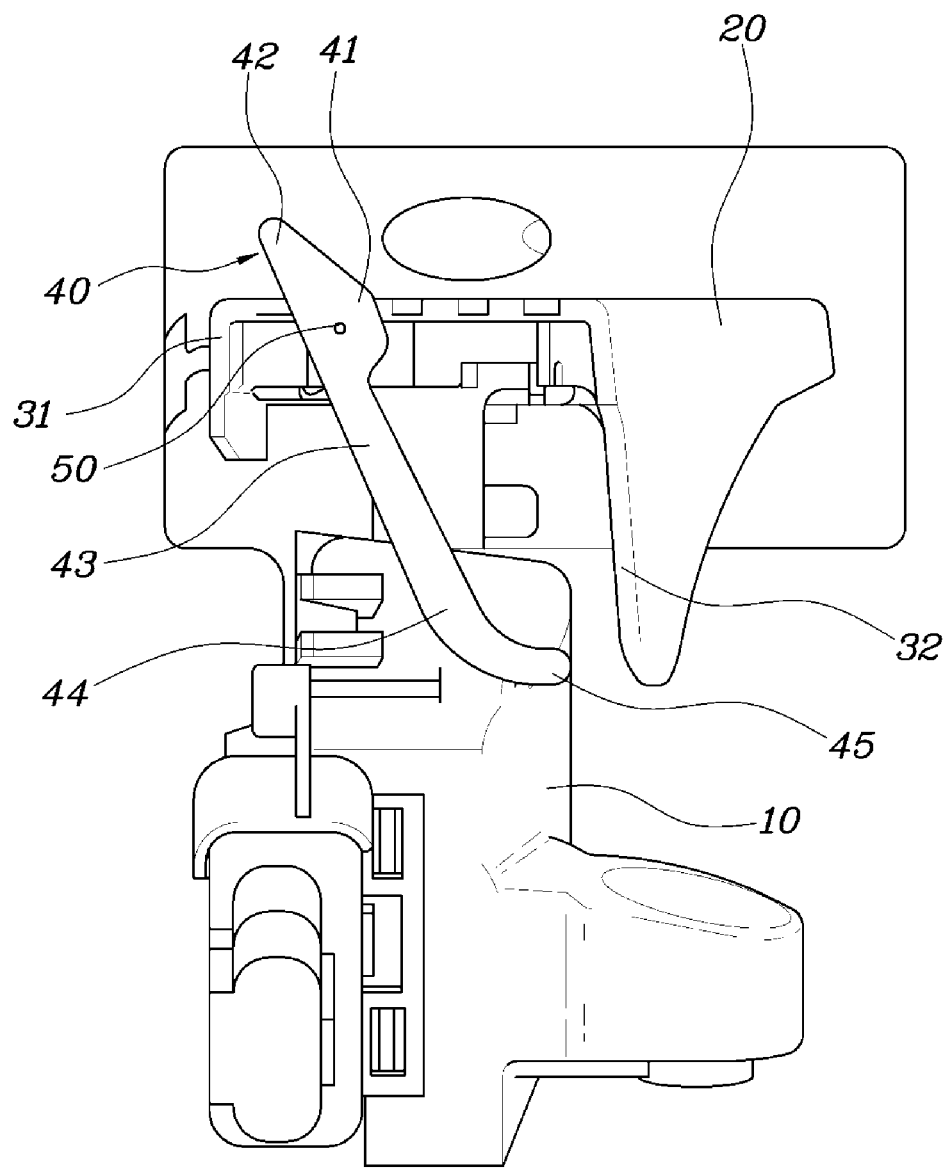
Figure 5:
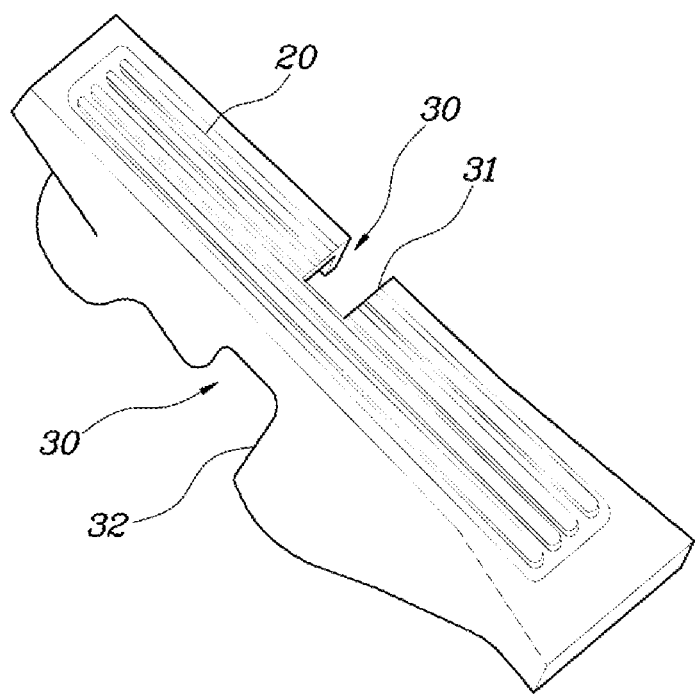
FIG. 5 is a perspective view illustrating a pad having a lever actuating hole according to the present invention.
Figure 6:
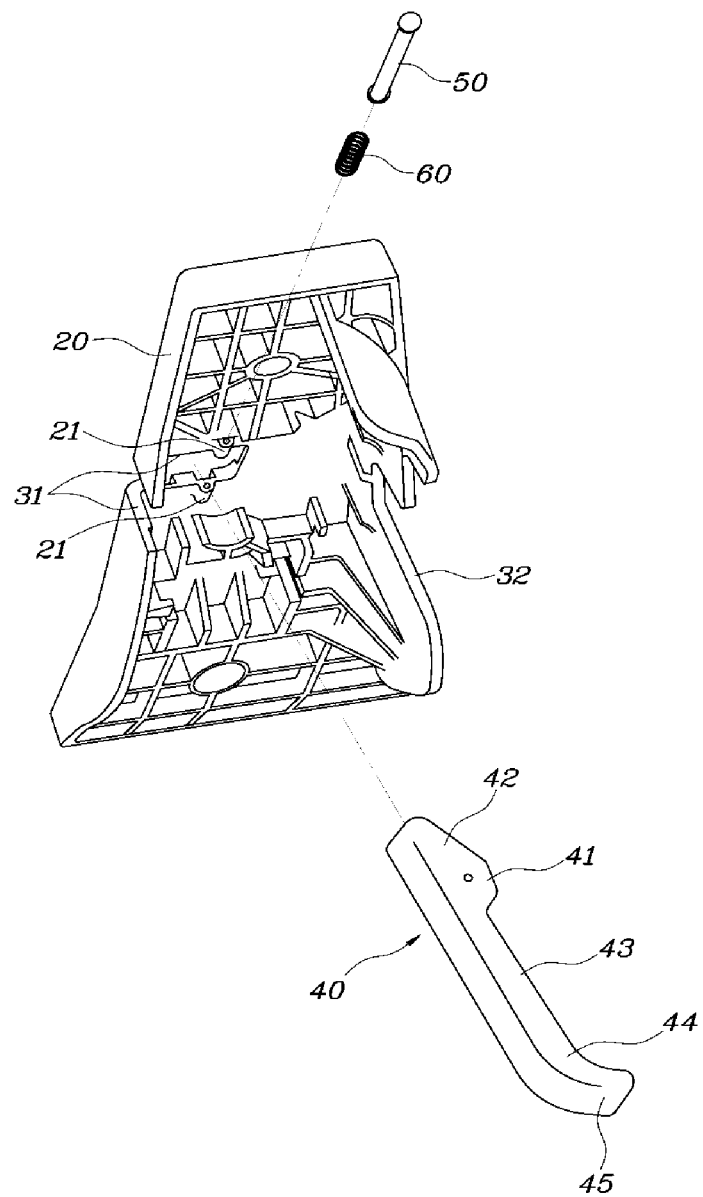
FIG. 6 is an exploded perspective view illustrating a rotary lever and the pad according to the present invention.

As illustrated in FIG. 1, the accelerator pedal of the vehicle includes a pedal housing 10 that is configured to be fixedly mounted on a panel of a vehicular body, and a pad 20 that is operated by a driver's foot and is rotatably coupled at one end thereof to the pedal housing 10.

As illustrated in FIGS. 1 to 11B, the safety apparatus of the accelerator pedal for the vehicle according to the present invention includes a lever actuating hole 30 that is formed vertically and horizontally through the pad 20 of the accelerator pedal that is operated by a driver's foot, and a rotary lever 40 that passes through the lever actuating hole 30, and is rotatably provided on the pad 20 such that a first end thereof protrudes upwards from the pad and a second end thereof comes into contact with a pedal housing 10 under the pad 20. The rotary lever 40 prevents the pad 20 from being rotated towards the pedal housing 10 when the second end thereof comes into contact with the pedal housing 10.

The safety apparatus of the invention may further include a lever pin 50 that passes through the rotary lever 40 to be coupled at both ends thereof to the pad 20 and serves as a rotation center of the rotary lever 40, and a lever spring 60 that surrounds the lever pin 50, is secured at a first end thereof to the pad 20 and at a second end thereof to the rotary lever 40, provides an elastic force to the rotary lever 40 such that the second end of the rotary lever 40 maintains contact with the pedal housing 10 when a driver presses down only the pad 20, and provides a returning force to the rotary lever 40 such that the second end of the rotary lever 40 maintains contact with the pedal housing 10 when the driver's pressing force is removed from the rotary lever 40.

The lever actuating hole 30 includes a first hole 31 that is formed by cutting in an 'L' shape to connect an upper surface and a first side surface of the pad 20 to each other, and causes the first end of the rotary lever 40 protruding upwards from the pad 20 to be rotated without interfering with the pad 20, and a second hole 32 that is formed by cutting a second side surface of the pad 20, and causes the second end of the rotary lever 40 protruding downwards from the pad 20 to be rotated without interfering with the pad 20.

Pin coupling protrusions 21 protrude integrally from an edge of the first hole 31 on a lower surface of the pad 20, and have holes such that both ends of the lever pin 50 are coupled thereto.

Both ends of the lever pin 50 may be fixedly coupled to the pin coupling protrusion 21 such that the rotary lever 40 is provided to be rotatable relative to the lever pin 50. Alternatively, the rotary lever 40 and the lever pin 50 may be integrally coupled with each other such that the lever pin 50 itself is rotatably coupled to the pin coupling protrusions 21. The embodiment of the present invention will be described with reference to a structure wherein the rotary lever 40 rotates relative to the lever pin 50, as an example.

The rotary lever 40 includes a coupling portion 41 that is coupled to the pin coupling protrusions 21 using the lever pin 50, a manipulating portion 42 that passes through the first hole 31 to protrude upwards from the pad 20, an extending portion 43 that extends towards the pedal housing 10, and a bent portion 45 that is bent from the extending portion 43 through a round portion 44.

Based on the coupling portion 41, the manipulating portion 42 constitutes the first end of the rotary lever 40, and the extending portion 43, the round portion 44 and the bent portion 45 constitute the second end of the rotary lever 40.

When the driver presses down the rotary lever 40, namely, when the driver presses down the manipulating portion 42, the rotary lever 40 should be smoothly rotated relative to the lever pin 42. To this end, the rotary lever 40 is preferably provided diagonally from the first end protruding upwards from the pad 20 to the second end coming into contact with the pedal housing 10.

When the rotary lever 40 is installed as such, the first end of the rotary lever 40 passing through the first hole 31 and protruding upwards from the pad 20 is preferably provided to be located at a central portion of a length of the pad 20 in a longitudinal direction thereof, and is preferably located to be opposite to the brake pedal with reference to a central line C1 bisecting a width of the pad 20 in a transverse direction thereof, as illustrated in FIG. 1.

That is, in order to allow the manipulating portion 42 of the rotary lever 40 to be easily manipulated when the driver operates the accelerator pedal, the first end (manipulating portion) of the rotary lever 40 is preferably located at the central portion in the longitudinal direction of the pad 20.

Further, in order to prevent the accelerator pedal from being operated together with the brake pedal when the driver operates the brake pedal, the first end (manipulating portion 42) of the rotary lever 40 is preferably spaced apart from the brake pedal as far as possible. To this end, the first end (manipulating portion 42) of the rotary lever 40 is preferably located to be opposite to the brake pedal with reference to the central line C1 bisecting the width of the pad 20.

The second end of the rotary lever 40 includes the bent portion 45 that is in surface contact with the pedal housing 10. The bent portion 45 generates a support force on the rotary lever 40 to prevent the pad 20 from being rotated towards the pedal housing 10 when the driver does not press down both the pad 20 and the manipulating portion 42 of the rotary lever 40 but presses down only the pad 20.

Further, the rotary lever 40 is configured such that the bent portion 45 is connected through the round portion 44. The round portion 44 comes into contact with the pedal housing 10 when the rotary lever 40 returns to its original position, thus aiding in the returning operation of the pad 20.

When the pressing force is removed in the state where the driver presses down both the pad 20 and the rotary lever 40, the returning force for causing the lever spring 60 to return the rotary lever 40 to the original position thereof with an accumulated elastic force is preferably larger than a returning force of the pad 20.

That is, if the returning operation of the rotary lever 40 is faster than that of the pad 20, it is advantageous in that the rotary lever 40 aids in the returning operation of the pad 20. Particularly, if the rotary lever 40 returns rapidly to its original position and thus the bent portion 45 comes into contact with the pedal housing 10, the support force is generated on the rotary lever 40 by the bent portion 45. Thereby, even if the driver mal-operates the pad 20, the pad 20 is not rotated towards the pedal housing 10. Consequently, the present invention can faithfully carry out the function of the safety apparatus.

Hereinafter, an operation of the present embodiment will be described.

Figure 7:
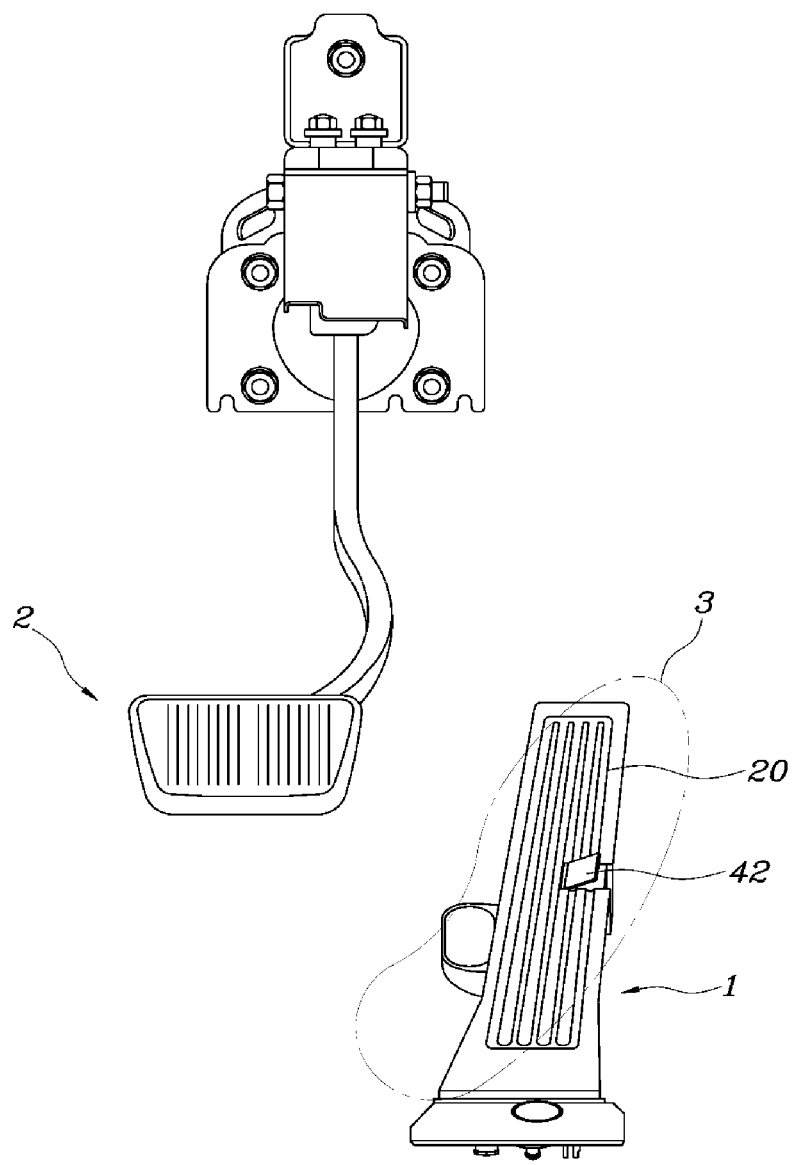
FIG. 7 and FIG. 8 are views illustrating a state in which a driver presses down both the pad and the rotary lever, according to the present invention.
Figure 8:
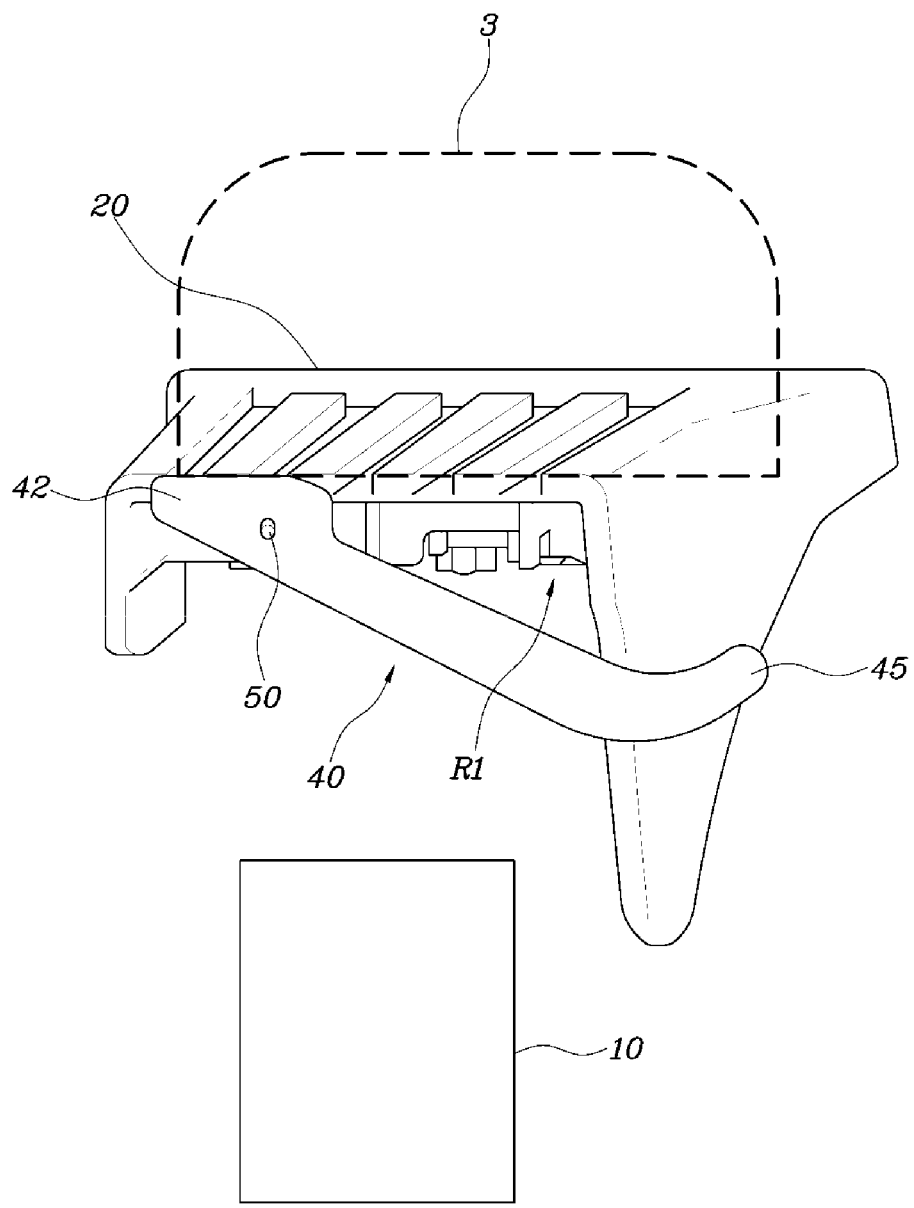

FIGS. 7 and 8 show a situation where the driver correctly operates only the accelerator pedal 1. In order to correctly operate the accelerator pedal, the driver's foot 3 should press down both the pad 20 and the manipulating portion 42 of the rotary lever 40.

That is, if the driver's foot 3 is placed on the accelerator pedal, the driver's foot 3 first comes into contact with the manipulating portion 42 of the rotary lever 40 to rotate the rotary lever 40 (arrow R1), and the bent portion 45 of the rotary lever 40 is separated from the pedal housing 10. If the manipulating portion 42 becomes parallel to an upper surface of the pad 20 by a continuous operation, the accelerator pedal is normally operated as the pad 20 rotates towards the pedal housing 10.

Figure 12:
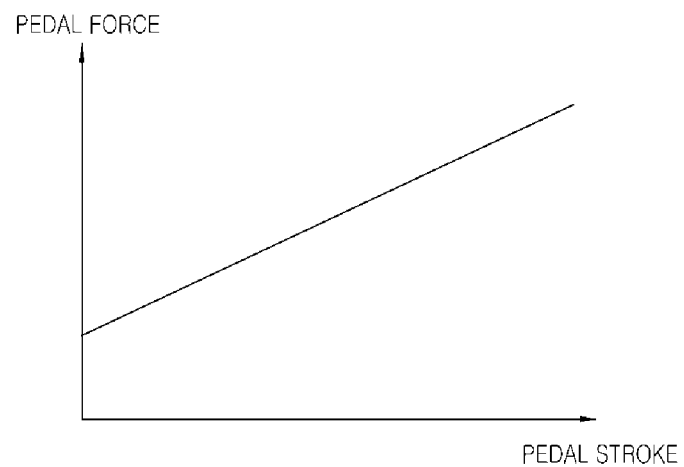
FIG. 12 and FIG. 13 are graphs illustrating relationships between a pedal force and a pedal stroke in a conventional accelerator pedal and an accelerator pedal according to the present invention.

Since conventional accelerator pedals that are commonly used have no rotary lever unlike the present invention, a driver rotates only the pad to operate the accelerator pedal. Thus, a change in pedal force as the function of the pedal stroke is represented by a rectilinear graph showing a linear increase, as illustrated in FIG. 12.

Figure 13:
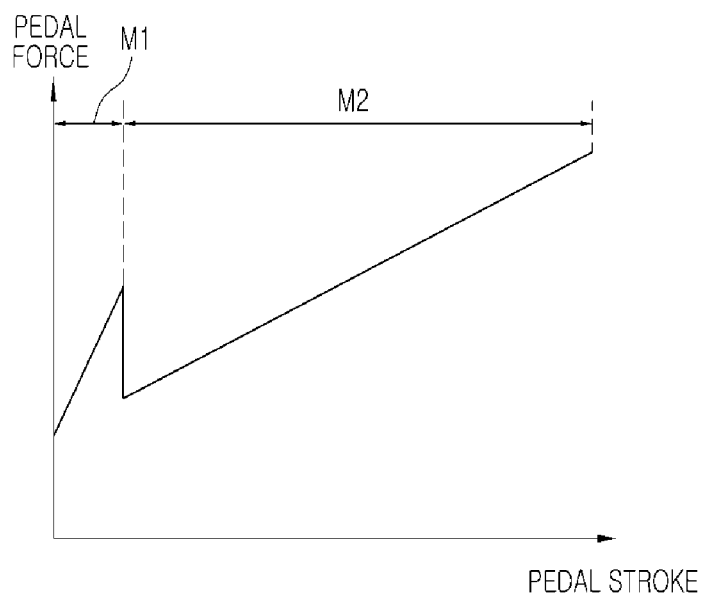

However, according to the present embodiment, when the accelerator pedal is correctly operated, the driver first operates the rotary lever 40 prior to operating the pad 20. Thus, when the rotary lever 40 is operated, the reaction force of the lever spring 60 is transmitted. Consequently, in an initial operating stage, the pedal force is abruptly increased as in a section M1 of FIG. 13. Subsequently, when the pad 20 is operated after the operation of the rotary lever 40 is completed, the change in pedal force as the function of the pedal stroke is linearly increased as in a section M2.

Therefore, since the reaction force of the lever spring 60 is transmitted in the initial operating stage of the accelerator pedal, the driver recognizes that the accelerator pedal is being correctly operated.

Figure 9A:
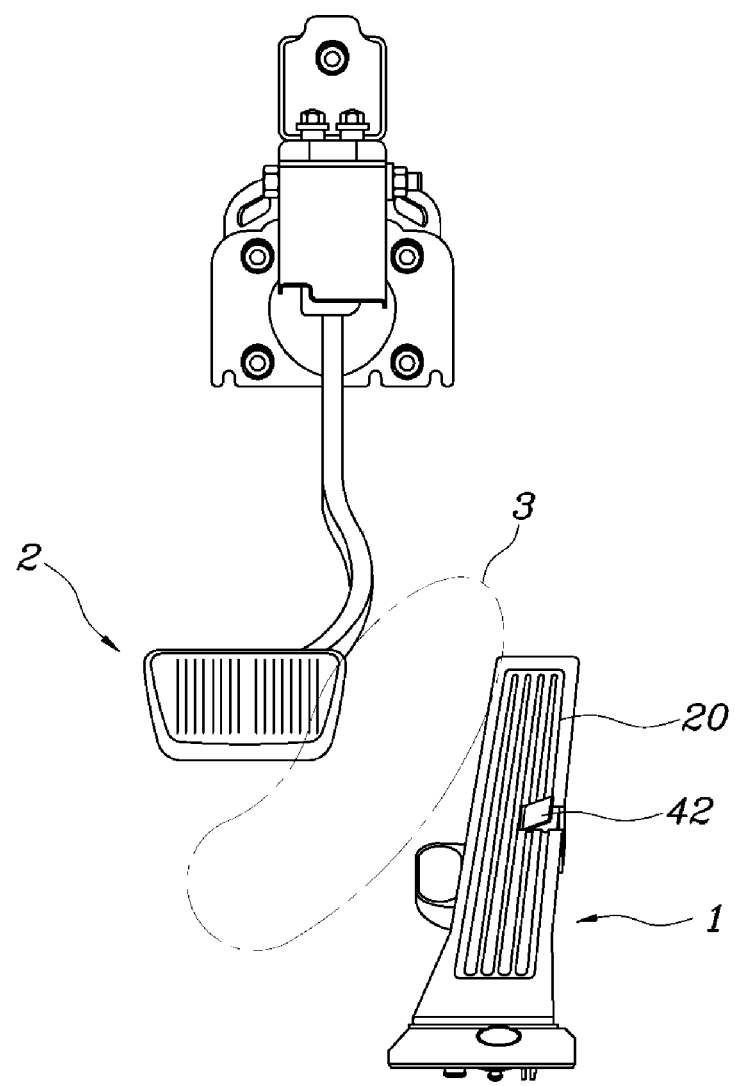
FIG. 9A, FIG. 9B, and FIG. 10 are views illustrating a state in which a driver presses down only the pad, according to the present invention.
Figure 9B:
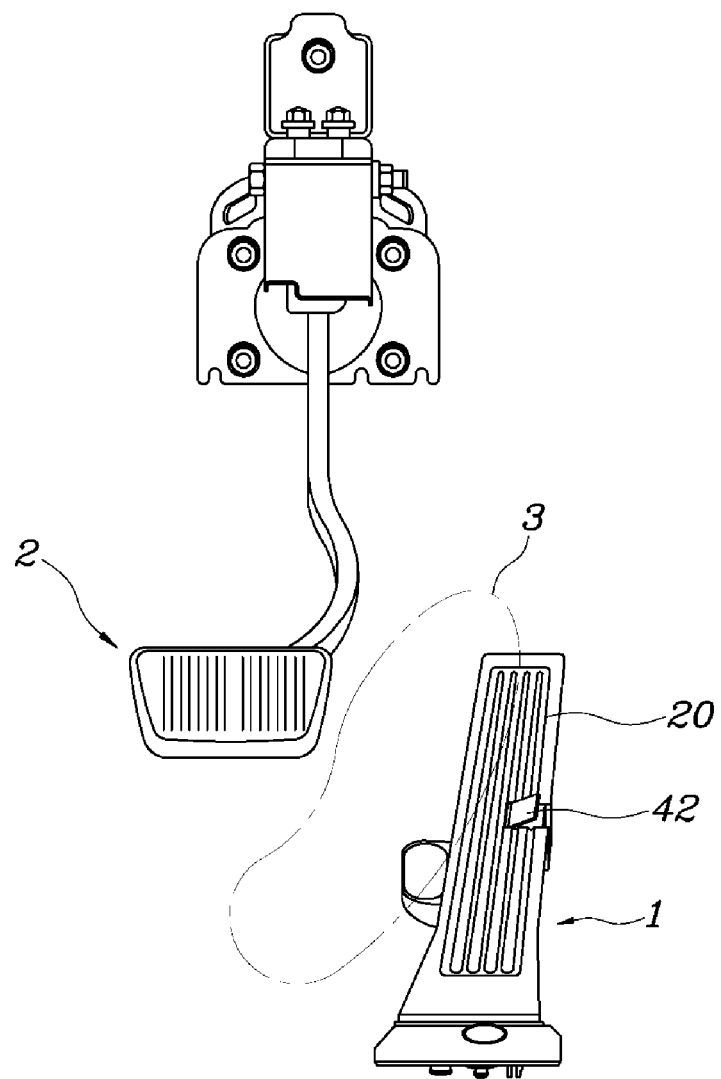
Figure 10:
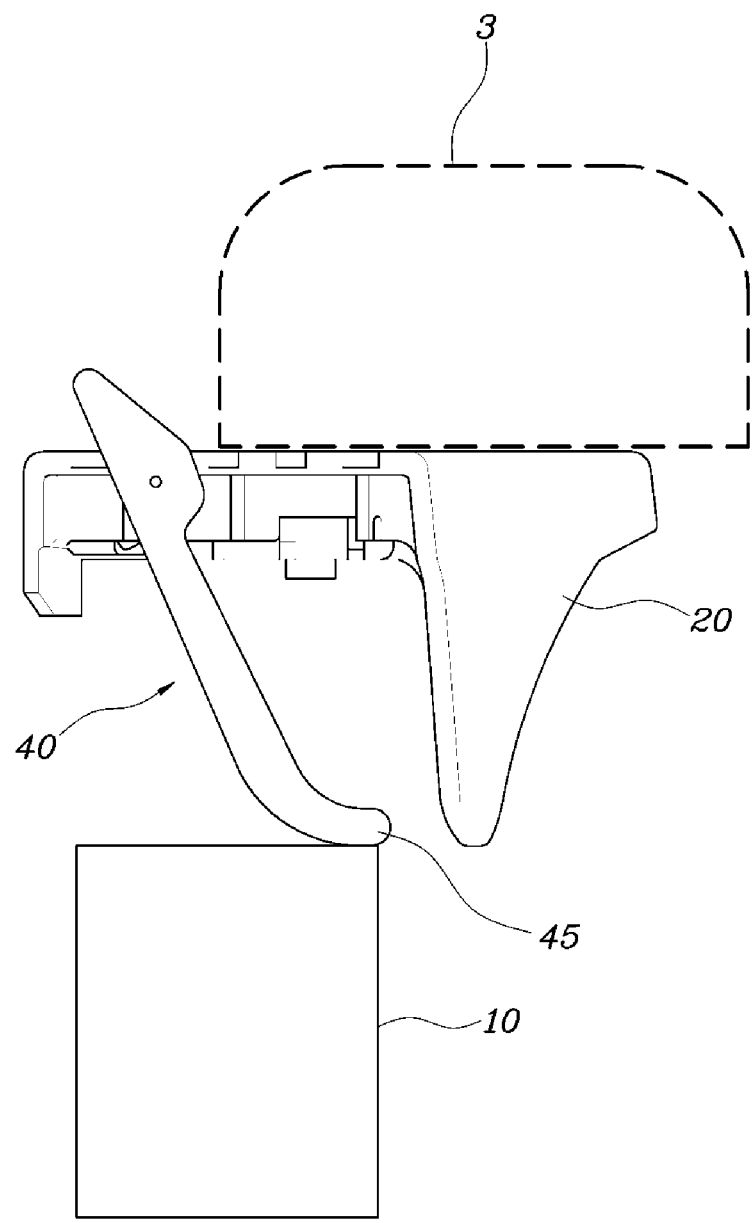

FIGS. 9A and 9B and FIG. 10 illustrate a state where the driver operates the accelerator pedal 1 instead of the brake pedal 2 by mistake in a situation where a braking operation is required. FIG. 9A illustrates a state where the driver presses down both the accelerator pedal 1 and the brake pedal 2, and FIG. 9B illustrates a state where the driver presses down only the accelerator pedal 1, especially a state where the manipulating portion 42 of the rotary lever 40 is not pressed down but only the pad 20 is pressed down when the driver presses down the accelerator pedal 1.

As such, in the case where the driver operates the accelerator pedal 1 instead of the brake pedal 2 by mistake, the driver's foot 3 is in the vicinity of the brake pedal 2 and thus is spaced apart from the manipulating portion 42 of the rotary lever 40. In such a state, if the driver mal-operates the accelerator pedal 1, the driver's foot 3 does not operate the manipulating portion 42 of the rotary lever 40.

Thus, the pedal force is exerted in the state where the driver does not press down the manipulating portion 42 of the rotary lever 40 but presses down only the pad 20. At this time, the rotary lever 40 is not rotated, so that the bent portion 45 of the rotary lever 40 maintains the contact with the pedal housing 10. In such a situation, the pad 20 is not rotated towards the pedal housing 10 by the support force of the rotary lever 40. Consequently, as the pad 20 is not rotated, the mal-operation of the accelerator pedal 1 can be prevented.

Figure 11A:
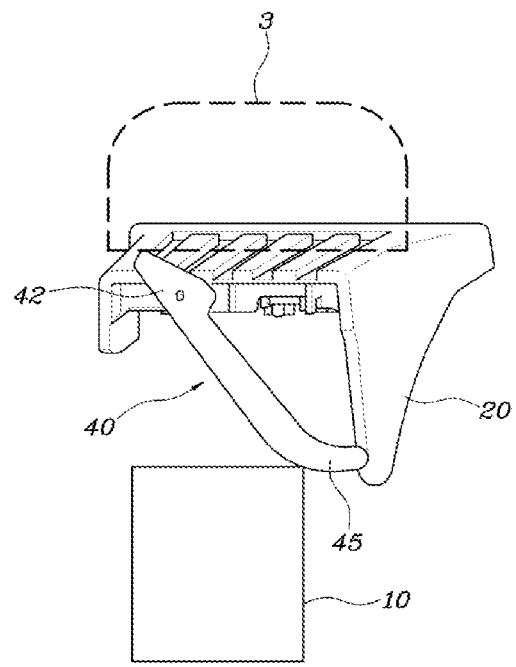
FIG. 11A and FIG. 11B are views illustrating a change from the state in which a driver presses down both the pad and the rotary lever to the state in which the driver presses down only the pad, according to the present invention.
Figure 11B:
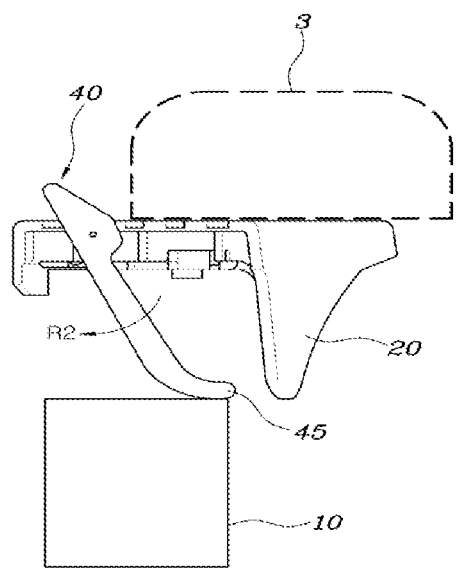

Further, FIG. 11A illustrates a state where the driver presses down both the rotary lever 40 and the pad 20 to correctly operate the accelerator pedal, and FIG. 11B illustrates a state where slip occurs from the state of FIG. 11A, so that the driver's foot 3 is separated from the manipulating portion 42 of the rotary lever 40.

If a change is made from the state of FIG. 11A to the state of FIG. 11B, the returning force of the rotary lever 40 by the accumulated elastic force of the lever spring 60 is larger than the returning force of the pad 20, so that the rotary lever 40 rotates and returns to its original position prior to the pad 20 (arrow R2). In such a process, the round portion 44 of the rotary lever 40 comes into contact with the pedal housing 10 to aid in the returning operation of the pad 20.

Further, if the rotary lever 40 returns to its original position prior to the pad 20, the bent portion 45 comes into contact with the pedal housing 10 and generates the support force on the rotary lever 40. Therefore, even when the driver presses down only the pad 20 and mal-operates the accelerator pedal, the pad 20 is not rotated towards the pedal housing 10. Consequently, the present invention can faithfully carry out the function of the safety apparatus.

As described above, the present invention provides a safety apparatus of an accelerator pedal for a vehicle, in which, even if a driver presses down an accelerator pedal instead of a brake pedal by mistake in a situation where a braking operation is required, a pad is prevented from being rotated towards a pedal housing in the situation where he or she does not press down a rotary lever but presses down only the pad of the accelerator pedal, thus preventing the mal-operation of the accelerator pedal and enhancing safety.

Particularly, the present invention provides a safety apparatus of an accelerator pedal for a vehicle, in which it is possible to prevent the mal-operation of an accelerator pedal using a rotary lever that is provided on a pad of the accelerator pedal, and it has a relatively simple configuration, is inexpensive, and is also applicable to an inexpensive diffusion-type vehicle.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A safety apparatus of an accelerator pedal for a vehicle, the safety apparatus comprising:
   a lever actuating hole formed through a pad of the accelerator pedal that is configured to be operated by a driver's foot; and
   a rotary lever passing through the lever actuating hole, and rotatably provided on the pad such that a first end of the rotary lever protrudes upwards from the pad and a second end of the rotary lever comes into contact with a pedal housing under the pad, the rotary lever preventing the pad from being rotated towards the pedal housing when the second end of the rotary lever comes into contact with the pedal housing.

2. The safety apparatus as set forth in claim 1, further comprising a lever pin passing through the rotary lever to be coupled at first and second ends of the lever pin to the pad, and serving as a rotation center of the rotary lever.

3. The safety apparatus as set forth in claim 1, further comprising:
   a lever spring secured at a first end thereof to the pad and at a second end thereof to the rotary lever, providing an elastic force to the rotary lever such that the second end of the rotary lever maintains contact with the pedal housing when the driver's foot presses down only the pad, and providing a returning force to the rotary lever such that the second end of the rotary lever maintains contact with the pedal housing when a driver's pressing force is removed from the rotary lever.

4. The safety apparatus as set forth in claim 3, wherein, when the pressing force is removed in a state where the driver's foot presses down both the pad and the rotary lever, a returning force for causing the lever spring to return the rotary lever to an original position thereof with an accumulated elastic force is larger than a returning force of the pad.

5. The safety apparatus as set forth in claim 1, wherein the lever actuating hole comprises:
   a first hole, formed by cutting, to connect an upper surface and a first side surface of the pad to each other, and allowing the first end of the rotary lever protruding upwards from the pad to be rotated without interfering with the pad; and
   a second hole formed by cutting a second side surface of the pad, and allowing the second end of the rotary lever protruding downwards from the pad to be rotated without interfering with the pad.

6. The safety apparatus as set forth in claim 5, wherein the first end of the rotary lever passing through the first hole and protruding upwards from the pad is located at a central portion of a length of the pad in a longitudinal direction thereof, and located opposite to the brake pedal with reference to a central line bisecting a width of the pad in a transverse direction thereof.

7. The safety apparatus as set forth in claim 5, wherein pin coupling protrusions protrude integrally from an edge of the first hole on a lower surface of the pad, and have holes such that first and second ends of a lever pin are coupled thereto.

8. The safety apparatus as set forth in claim 7, wherein the rotary lever comprises:
- a coupling portion coupled to the pin coupling protrusions using the lever pin;
- a manipulating portion passing through the first hole to protrude upwards from the pad;
- an extending portion extending towards the pedal housing; and
- a bent portion bent from the extending portion through a round portion.

9. The safety apparatus as set forth in claim 1, wherein the rotary lever is provided diagonally from the first end thereof protruding upwards from the pad to the second end thereof, making contact with the pedal housing such that the rotary lever rotates when the driver's foot presses down the rotary lever.

10. The safety apparatus as set forth in claim 1, wherein the second end of the rotary lever comprises a bent portion that contacts the pedal housing, and the bent portion exerts a support force on the pedal housing to prevent the pad from being rotated towards the pedal housing when the driver's foot presses down only the pad.

11. The safety apparatus as set forth in claim 10, wherein the bent portion is connected via a round portion, and
- the round portion makes contact with the pedal housing when the rotary lever returns to an original position thereof, thus aiding in a returning operation of the rotary lever.

\* \* \* \* \*